United States Patent
Lu et al.

(10) Patent No.: US 9,618,408 B2
(45) Date of Patent: Apr. 11, 2017

(54) SYSTEM AND METHOD FOR TORQUE TRANSDUCER AND TEMPERATURE SENSOR

(71) Applicant: General Electric Company, Schenectady, NY (US)

(72) Inventors: Dan Tho Lu, Minden, NV (US); Pekka Tapani Sipila, Garching (DE); Clifford James Uber, Minden, NV (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/973,301

(22) Filed: Dec. 17, 2015

(65) Prior Publication Data

US 2016/0252415 A1    Sep. 1, 2016

Related U.S. Application Data

(60) Provisional application No. 62/121,323, filed on Feb. 26, 2015.

(51) Int. Cl.
| | |
|---|---|
| *G01L 3/02* | (2006.01) |
| *G01L 3/10* | (2006.01) |
| *G01L 25/00* | (2006.01) |
| *G01L 1/12* | (2006.01) |

(52) U.S. Cl.
CPC ............ *G01L 3/102* (2013.01); *G01L 25/003* (2013.01); *G01L 1/127* (2013.01); *G01L 3/105* (2013.01)

(58) Field of Classification Search
CPC .......... G01L 3/102; G01L 3/105; G01L 1/127

USPC .................................. 73/862.331–862.336; 74/862.331–862.336
See application file for complete search history.

(56) References Cited

U.S. PATENT DOCUMENTS

| | | | |
|---|---|---|---|
| 3,465,581 A | 9/1969 | Hohenberg | |
| 4,596,150 A * | 6/1986 | Kuhr | G01B 7/24 324/209 |
| 4,829,834 A | 5/1989 | Masom | |
| 4,899,598 A | 2/1990 | Gumaste et al. | |
| 4,939,937 A | 7/1990 | Klauber et al. | |
| 5,182,953 A | 2/1993 | Ellinger et al. | |
| 5,307,690 A * | 5/1994 | Hanazawa | G01L 3/105 73/862.331 |
| 5,323,659 A * | 6/1994 | Wakamiya | G01L 3/105 73/862.28 |
| 5,515,736 A * | 5/1996 | Kawagoe | G01D 3/036 73/862.331 |
| 5,708,216 A | 1/1998 | Garshelis | |
| 5,887,335 A | 3/1999 | Garshells | |
| 6,490,934 B2 | 12/2002 | Garshelis | |

(Continued)

*Primary Examiner* — Max Noori
(74) *Attorney, Agent, or Firm* — Fletcher Yoder, P.C.

(57) ABSTRACT

A system includes a magnetostrictive sensor having a sensor head including a driving pole. The driving pole includes a driving coil that may receive a driving current and may emit a magnetic flux portion through a rotary structure. The sensor head also includes a sensing pole including a sensing coil that may receive the magnetic flux portion and may transmit a signal based at least in part on the received magnetic flux portion. The received magnetic flux portion is based at least in part on a force on the rotary structure. The sensor head also includes a temperature sensor disposed on the sensor head. The temperature sensor may measure a temperature of the rotary structure.

20 Claims, 6 Drawing Sheets

(56) References Cited

U.S. PATENT DOCUMENTS

| | | | |
|---|---|---|---|
| 6,591,699 B2 | 7/2003 | Ueno | |
| 6,957,589 B2 | 10/2005 | Ueno et al. | |
| 7,454,978 B2 | 11/2008 | Schroeder et al. | |
| 7,533,584 B1 | 5/2009 | Wahl | |
| 7,821,321 B2 | 10/2010 | Zimlich | |
| 8,215,898 B2 * | 7/2012 | Nakazeki | F16C 19/52 415/104 |
| 8,692,545 B2 | 4/2014 | Shimada et al. | |
| 2006/0225521 A1 | 10/2006 | Von Beck et al. | |
| 2012/0025528 A1 | 2/2012 | Sipila et al. | |
| 2012/0212169 A1 * | 8/2012 | Wu | H02P 7/285 318/432 |
| 2013/0263654 A1 | 10/2013 | Pietron et al. | |
| 2014/0184210 A1 * | 7/2014 | Campbell | G01L 1/122 324/209 |

\* cited by examiner

SYSTEM AND METHOD FOR TORQUE TRANSDUCER AND TEMPERATURE SENSOR

CROSS REFERENCE TO RELATED APPLICATIONS

This application claims priority from and the benefit of Provisional Patent Application No. 62/121,323, entitled "System and Method for Torque Transducer and Temperature Sensor," filed Feb. 26, 2015, which is hereby incorporated by reference in its entirety.

BACKGROUND

The subject matter disclosed herein relates generally to sensors, and more particularly to temperature sensors for magnetostrictive sensors.

Sensors are used in a variety of industries to sense vibration, torque, speed, force, position, temperature, and other parameters. In certain applications, the performance of the sensor may decrease due to electrical and/or magnetic interference, temperature fluctuations, and stress, among others. Unfortunately, separate temperature sensors may cause electrical interference, magnetic interference, or be affected by temperature gradients.

BRIEF DESCRIPTION

Certain embodiments commensurate in scope with the present disclosure are summarized below. These embodiments are not intended to limit the scope of the claims, but rather these embodiments are intended only to provide a brief summary of certain embodiments. Indeed, embodiments of the present disclosure may encompass a variety of forms that may be similar to or different from the embodiments set forth below.

In a first embodiment, a system includes a magnetostrictive sensor having a sensor head including a driving pole. The driving pole includes a driving coil that may receive a driving current and may emit a magnetic flux portion through a rotary structure. The sensor head also includes a sensing pole including a sensing coil that may receive the magnetic flux portion and may transmit a signal based at least in part on the received magnetic flux portion. The received magnetic flux portion is based at least in part on a force on the rotary structure. The sensor head also includes a temperature sensor disposed on the sensor head. The temperature sensor may measure a temperature of the rotary structure.

In a second embodiment, a system includes a magnetostrictive sensor head including a driving coil coupled to a driving pole extending from a sensor head core, that may receive a driving current, and that may emit a magnetic flux portion through a rotary structure, and a sensing coil coupled to a sensing pole extending from the sensor head core. The sensing coil may receive the magnetic flux portion, the sensing coil may transmit a first signal based at least in part on the received magnetic flux portion, and the received magnetic flux portion is based at least in part on a force on the rotary structure at a section of the rotary structure opposite the magnetostrictive sensor head. The system also includes a temperature sensor coupled to the magnetostrictive sensor head. The temperature sensor transmits a second signal based on the temperature of the section of the rotary structure.

In a third embodiment, a method includes generating a magnetic flux portion with a driving coil coupled to a driving pole of a magnetostrictive torque sensor and directing the magnetic flux portion through the rotary structure and a sensing pole of the magnetostrictive torque sensor. The rotary structure comprises a ferromagnetic material. The method also includes detecting the magnetic flux portion with a sensing coil coupled to the sensing pole. The sensing coil may generate a torque signal based at least in part on a torque on the rotary structure. The method also includes measuring a temperature of the rotary structure with a temperature sensor disposed within the magnetostrictive torque sensor. The temperature sensor may generate a temperature signal. The method also includes determining the torque on the rotary structure based at least in part on the torque signal from the sensing coil and the temperature signal from the temperature sensor.

BRIEF DESCRIPTION OF THE DRAWINGS

These and other features, aspects, and advantages of the present disclosure will be better understood when the following detailed description is read with reference to the accompanying drawings in which like characters represent like parts throughout the drawings, wherein.

DETAILED DESCRIPTION

Figure 1:
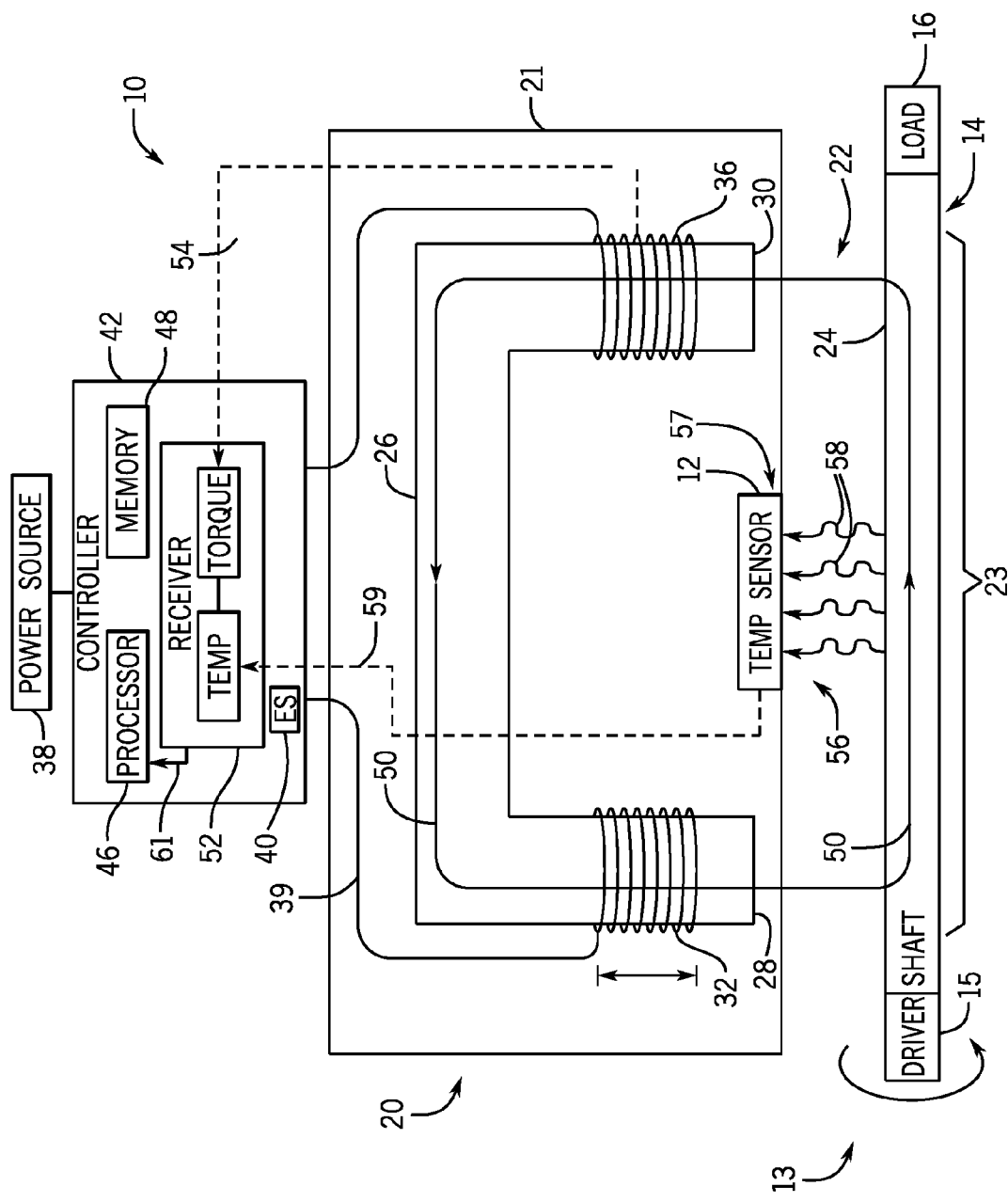
FIG. 1 is a side view of an embodiment of a magnetostrictive sensing system, wherein the magnetostrictive sensing system includes a temperature sensor in accordance with the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

In certain embodiments, such as oil and gas and energy applications, magnetostrictive sensors may be used to measure the torque of a shaft. Magnetostrictive torque sensors for such applications employ a sensing method in which a magnetic field is generated in the sensor by passing electric current through an excitation coil. In magnetostrictive torque sensors, this magnetic field permeates the shaft and returns back to a sensing coil (e.g., a pick-up coil) of the sensor. The output of the sensor coil is an electrical signal that depends at least in part on the total magnetic reluctance of this loop through the shaft. Part of the total magnetic reluctance is established by the air gap between the coils and the shaft and part of the total magnetic reluctance is established by the shaft itself with the magnetic reluctance of the shaft changing as a function of torque on the shaft.

In general, non-contact magnetostrictive torque sensors are used with shafts that have been pre-magnetized (e.g., treated). Pre-magnetization of the shaft may facilitate torque measurements by amplifying the intrinsic magnetostrictive properties of the shaft. As such, the magnetic flux generated due to the shaft torque may be detected by the non-contact magnetostrictive torque sensor. However, not all equipment or systems include pre-magnetized (e.g., treated) shafts. For example, in certain equipment, torque measurements may not have been desired at the time of manufacturing the equipment or the torque may be measured by other techniques that did not utilize magnetostrictive sensors (e.g., non-contact magnetostrictive sensors).

Retro-fitting systems having untreated shafts with non-contact magnetostrictive sensors (e.g., if torque measurements are desired post manufacturing) may be costly and inefficient. For example, the untreated shaft may need to be removed from the equipment for treatment to generate a magnetized shaft (e.g., a treated shaft). Accordingly, shaft treatment after equipment manufacturing or after system assembly may increase labor and equipment costs associated with treated shaft systems. Furthermore, in equipment that uses treated shafts (e.g., magnetized shafts), certain conditions may decrease the magnetization of the shaft (e.g., equipment overheating) over time, thereby decreasing amplification of the shaft's magnetostrictive properties, weakening the magnetic field flowing through the shaft, or resulting in inaccurate torque measurements, or any combination thereof. Therefore, it may be advantageous to develop a non-contact magnetostrictive sensor that may be used with untreated (non-magnetized) rotary shafts. Non-contact magnetostrictive sensors that may be used with untreated rotary shafts may increase the accuracy of the torque measurements and facilitate retro-fitting existing systems that do not have treated shafts with a non-contact magnetostrictive sensor. In this way, equipment may be manufactured and/or retro-fit with non-contact magnetostrictive sensors for torque measurement without the costs associated with treatment (e.g., magnetization) of the shaft. In addition, production efficiency for the equipment may be increased due, in part, to reducing processing steps generally associated with magnetization of the shaft.

The magnetostrictive torque sensor may include a driving coil to generate magnetic flux (e.g., the magnetic field) that passes through the shaft (e.g., a ferromagnetic material) and is sensed by the sensing coil. Changes in the measured magnetic flux depend partly on the changes in magnetic permeability of the shaft, which in turn are related to the amount of force applied to the shaft. Therefore, measurement of the magnetic flux passing through the shaft may be used to sense and/or calculate the value of the applied force (e.g., torque). However, the magnetic properties of the shaft may change as a result of heat or other factors associated with a system that employs a magnetostrictive sensor. As such, the magnetic flux passing through the shaft (e.g., the ferromagnetic material) may also change. For example, temperature variations of the shaft may affect (e.g., change) the shaft's electromagnetic properties (e.g., electrical conductivity and magnetic permeability). The changes in the electromagnetic properties of the shaft may cause variations in the signal received by the magnetostrictive sensor. Consequently, the torque measurement derived from the signals received and transmitted by the sensing coil may be different than the actual torque on the shaft. In addition, variations in the electromagnetic properties of the sensor coils, may also affect torque measurements. Therefore, it may be desirable to measure a temperature of the shaft at or proximate to where the torque measurement is taken during operation of the shaft, and use the temperature measurement to compensate for changes in the magnetic permeability of the shaft caused by the temperature variations. In this way, the accuracy of the torque measurements may be increased. Accordingly, the present disclosure provides a non-contact magnetostrictive torque sensor with an integrated temperature sensor that may measure a temperature of the shaft or other target surfaces.

In addition to measuring the surface temperature of the shaft, it may be desirable to generate temperature measurements while the shaft is rotating. Real-time temperature measurements (e.g., during shaft rotation) may generate a more accurate temperature measurement compared to temperature measurements taken after the shaft has stopped rotating. For example, a temperature of the shaft after the shaft has stopped rotating may be less than a temperature of the shaft during rotation. Moreover, once the shaft has stopped rotating, torque is not being applied to the shaft. Therefore, adjusting torque measurements with a temperature of a non-rotating shaft may generate inaccurate results. The placement of the temperature sensors may also affect the torque measurements. For example, if a stand alone or other non-contacting temperature sensor is positioned near a torque sensitive area (e.g., near the sensing coil) of the torque sensor, torque measurements may be less accurate due to interference of the temperature sensor with the magnetic field. That is, the temperature sensor may affect the magnetic flux through the torque sensor, resulting in less accurate torque measurements. Similarly, if the temperature sensor is positioned remote from the torque sensor, such that the temperature sensor does not affect torque measurements, the temperature measurements may not correspond to the temperature of the shaft at or near the torque sensor due, in part, to a temperature gradient of the shaft between the torque sensor and the temperature sensor. That is, the shaft temperature at the torque sensor and the sensed temperature may be different because heat from the shaft dissipates away from the shaft, thereby causing a temperature gradient with a higher temperature near the shaft and a lower temperature near the temperature sensor.

In addition, combining signals from two separate sensors (e.g., a torque sensor and a remote temperature sensor) may be difficult to process, and a signal to noise ratio may increase due to additional cabling used to transmit the signals from the two stand alone sensors to a single processor. Integration of the temperature sensor with the torque sensor may reduce the signal to noise ratio and may enable the torque and temperature measurements to be taken from the same section of the shaft. Moreover, the integrated temperature sensor may be positioned within a torque measurement neutral region of the torque sensor, such that the temperature sensor does not interfere with the magnetic flux through the torque sensor and the shaft. For example, the torque measurement neutral region may be a magnetic neutral region or any other region on the torque sensor that does not interfere with the magnetic flux between the drive coil, shaft, and sensing coil. Additionally, or in the alternative, the torque measurement neutral region may be any region in which the magnetic flux from multiple drive coils may be readily compensated, such as via addition or subtraction of a common magnetic field flux. Further, by integrating the temperature sensor with the torque sensor, both sensors may use the same printed wiring board (PWB) or printed circuit board (PCB) for signal processing, thereby facilitating signal integration.

FIG. 1 is a side view of an embodiment of a torque sensing system 10 that includes a temperature sensor 12 in accordance with the present disclosure. The torque sensing system 10 may be used for sensing a force applied to a shaft 14 (e.g., a rotating shaft, a rotor, or any rotary structure) of a machine or equipment 13, such as a turbomachine (e.g., a turbine engine, a compressor, a pump, or a combination thereof), a generator, a combustion engine, or a combination thereof. The machine or equipment includes a driver 15 (e.g., reciprocating engine, combustion engine, turbine engine, electric motor) that applies a force to the shaft 14 and enables the shaft 14 to rotate and drive a load 16 (e.g., electrical generator, compressor, pump, etc.) of the machine or equipment. The shaft 14 may include ferromagnetic materials including, but not limited to, iron, steel, nickel, cobalt, alloys of one or more of these materials, or any combination thereof. In certain embodiments, the shaft is untreated (e.g., non-magnetized). In other embodiments, the shaft is treated (e.g., magnetized). The torque sensing system 10 includes a sensor head 20 that forms a housing 21 for the torque sensing system 10. The sensor head 20 is positioned proximate to the shaft 14, thereby forming a gap 22 between the sensor head 20 and a shaft surface 24. For example, the sensor head 20 may be disposed adjacent to a shaft section 23 that is substantially opposite the torque sensing system 10. As such, the torque sensing system 10 may measure a torque of the shaft 14 at the shaft section 23. In addition, because the temperature sensor 12 is integrated with the torque sensing system 10, the temperature sensor 12 may measure the temperature of the shaft section 23. As such, both the torque and temperature of the shaft 14 are measured at the shaft section 23. The sensor head 20 may be coupled to a frame or fixture to maintain the sensor head 20 in the proper orientation and/or position, and to facilitate maintaining the gap 22 constant.

Figure 2:
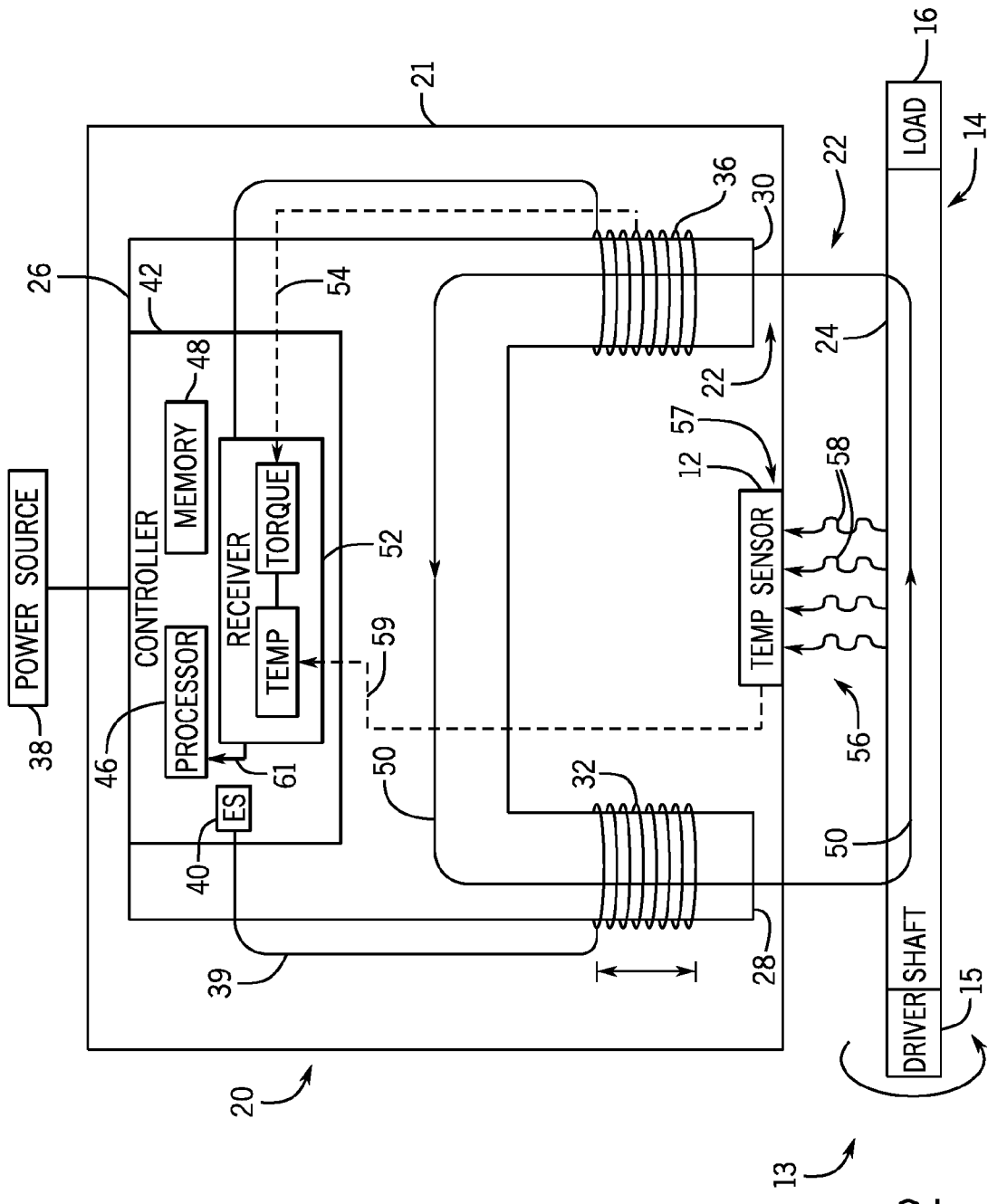
FIG. 2 is a side view of an embodiment of the magnetostrictive sensing system of FIG. 1, wherein the magnetostrictive sensing system includes a controller integrated with a sensor head in accordance with the present disclosure

The sensor head 20 has a core 26 that may be formed from a ferromagnetic material similar to or different from the ferromagnetic material of the shaft 14. The core 26 has at least two ends, such as a driving pole 28 and a sensing pole 30. As discussed in further detail below, in certain embodiments, the core 26 may have more than two ends. A driving coil 32 and a sensing coil 36 are disposed about (e.g., wrapped around) the driving pole 28 and the sensing pole 30, respectively. A power source 38 (e.g., electrical outlet, electrical generator, battery, etc.) provides power to controller 42, and an excitation source (ES) 40 provides an AC current 39 (e.g., driving current) to the driving coil 32. The driving current passes through the driving coil 32 to induce a magnetic flux portion 50 that emanates from the driving coil 32. In the illustrated embodiments, a controller 42 is electronically coupled to the excitation source 40 and is configured to control characteristics of the first driving current delivered to the driving coil 32 by the excitation source 40. For example, the controller 42 may control the frequency, amplitude, or the like, of the first driving current. The controller 42 may be coupled to the excitation source 40 by wired or wireless connections. Wireless communication devices, such as radio frequency (RF) transmitters, may be integrated with the controller 42 to transmit the signals to an RF receiver integrated with the excitation source 40. In certain embodiments, the controller 42 is integrated into the torque sensing system 10. For example, FIG. 2 illustrates the controller 42 disposed within the core 26 of the sensor head 20.

The controller 42 may include a distributed control system (DCS) or any computer-based workstation that is fully or partially automated. For example, the controller 42 may be any device employing a general purpose or an application-specific processor 46, both of which may generally include memory circuitry 48 for storing instructions related to frequencies, amplitudes of currents, for example. In addition, the memory circuitry 48 may include instructions and algorithms for integrating sensor signals (e.g., torque and temperature signals) and compensating torque measurements based on the temperature signal (e.g., temperature of the shaft 14). The processor 46 may include one or more processing devices, and the memory circuitry 48 may include one or more tangible, non-transitory, machine-readable media collectively storing instructions executable by the processor 46 to perform the methods and control actions described herein.

Such machine-readable media can be any available media other than signals that can be accessed by the processor or by any general purpose or special purpose computer or other machine with a processor. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by the processor or by any general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions includes, for example, instructions and data which cause the processor or any general purpose computer, special purpose computer, or special purpose processing machine to perform a certain function or group of functions, such as combining (e.g., integrating) the torque and temperature signals to determine the actual torque measurements.

As illustrated in FIG. 1, a magnetic flux portion 50 permeates the shaft 14, passes through the sensing coil 36, and returns to the driving coil 32 via the core 26, thereby forming a loop through the torque sensor 10 and the shaft 14. The sensing coil 36 may be used to measure the magnetic flux portion 50 exiting the shaft 14. A force (e.g., compressive, tensile, torsional, etc.) applied to the shaft 14 may change the magnetic permeability of the shaft 14, thereby causing the magnetic flux portion 50 to change. As such, the torque applied to the shaft 14 may be determined based on the change in magnetic flux portion 50 received by the sensing coil 36 relative to the magnetic flux portion 50 emitted by the driving coil 32. For example, the sensing coil 36 is configured to transmit a torque signal indicative of the changes (e.g., difference) in the magnetic flux portion 50 to the controller 42. The processor 46 of the controller 42 may process the torque signal received from the sensing coil 36 to calculate the force applied to the shaft 14. That is, the processor 46 may execute pre-stored and/or user-defined algorithms in the memory 48 to calculate the magnitude of the force applied to the shaft 14 based on the characteristics of the shaft 14, the sensor head 20, and the driving current.

The torque signal from the sensing coil 36 may be communicated by wired or wireless connections to the controller 42. In some embodiments, wireless communication devices, such as RF transmitters, may be integrated with the sensor head 20 (e.g., proximate to the sensing coil 36) to transmit the signals to an RF receiver 52 integrated with the controller 42. For example, the sensing coil 36 may transmit a torque signal 54 to the receiver 52. The receiver 52 may include electronic components (e.g., an amplifier, filter, or the like) that condition the torque signal 54 before transmitting the torque signal 54 to the processor 46. In other embodiments, the torque signal 54 is conditioned after being processed by the processer 46 of the controller 42.

As discussed above, a temperature of the shaft 14 may vary during operation of the equipment 16. This temperature variation may affect the permeability of the magnetic flux portion 50, thereby affecting the torque measurements. Consequently, without the disclosed embodiments, the determined torque measurement for the shaft 14 may not be the actual torque. Therefore, the temperature of the shaft 14 may be measured and used as a compensation factor for compensating the torque measurements based at least in part on the temperature variations. However, as discussed above, the position of the temperature sensor 12 relative to the shaft 14 may affect the magnetic flux portion 50 (e.g., if the temperature sensor is too close to the shaft 14) and/or the temperature measurements (e.g., if the temperature sensor is too far from the shaft 14). Therefore, integrating the temperature sensor 12 with the torque sensing system 10 may enable the temperature sensor 12 to generate accurate temperature measurements of the shaft 14 without interfering with the magnetic flux portion 50. In addition, the temperature sensor 12 may provide real-time temperature measurements during rotation of the shaft 14. As such, the torque sensing system 10 may generate both accurate torque and temperature measurements during rotation of the shaft 14. For example, the sensed temperature may be used to compensate for effects temperature changes of the shaft 14 during rotation may have on the magnetic permeability of the shaft 14. In this way, the temperature sensor 12 may improve the accuracy of torque measurements, and thus enable better control of the machine or equipment 16, such as a turbomachine (e.g., a turbine engine, a compressor, a pump, or a combination thereof), a generator, a combustion engine, or a combination thereof.

To reduce or eliminate magnetic flux disturbance between the torque sensing system 10 and the shaft 14, the temperature sensor 12 is disposed in a torque measurement neutral region 56, e.g., on the housing 21. The torque measurement neutral region 56 may be at any region of the torque sensing system 10 that does not interfere with the loop of the magnetic flux portion 50 flowing through the torque sensing system 10 and the shaft 14. For example, in the illustrated embodiment the torque measurement neutral region 56 is on the housing 21 away from the poles 28, 30. In some embodiments, the torque measurement neutral region 56 may be an axis centered between the driving pole 28 and the sensing pole 30. However, the torque measurement neutral region 56 may be between two sensing poles 30, in the core 26, or any other magnetic neutral region within the torque sensing system 10. In certain embodiments, the torque measurement neutral region 56 may be within a magnetic neutral region. For example, the torque measurement neutral region 56 may have a decreased magnetic permeability compared to the poles 28, 30. In other embodiments, the torque measurement neutral region 56 may not have any magnetic permeability. Therefore, by positioning the temperature sensor 12 within the torque measurement neutral region 56, the temperature sensor 12 may not interfere with the magnetic flux portion 50 flowing through the core 26 (e.g., via the poles 28, 30), which has a high magnetic permeability compared to the torque measurement neutral region 56.

It may be desirable for the temperature sensor 12 to be a non-contact sensor. As such, the temperature sensor 12 may measure the shaft temperature without having to be in direct contact with the shaft surface 24. In this way, magnetic flux disturbance associated with contact sensors (e.g., thermocouples, thermistors, resistance temperature detectors, or any other temperature sensor in direct contact with the shaft surface 24) may be mitigated. The system 10 may include one or more temperature sensors 12 in the torque measurement neutral region 56. In certain embodiments, the temperature sensor 12 may be an infrared (IR) sensor or other radiative heat/temperature sensor. The IR sensor may be disposed on an integrated circuit (IC) 57 that is coupled to the sensor head 20. For example, IR sensor may be disposed on the core 26, an additional pole, or any other portion of the sensor head 20 that is within a magnetic neutral region, as discussed below with reference to FIGS. 4 and 5. In other embodiments, the temperature sensor 12 may be a pyroelectric sensor or a thermopile sensor. The pyroelectric sensor measures a temperature voltage generated by the shaft 14 during heating and/or cooling. The controller 42 determines the temperature of the shaft 14 based on the temperature voltage sensed by the pyroelectric sensor. If the temperature sensor 12 is a thermopile, the thermopile senses thermal energy (e.g., radiation 58) from the shaft 14, and converts the thermal energy to an electrical signal used to determine the temperature of the shaft 14. In this way, the temperature sensor 12 may be adjacent to a torque measurement location (e.g., the shaft section 23), and a suitable distance away from the shaft surface 24. As such, the temperature sensor 12 may accurately measure the temperature of the rotating shaft 14 without disturbing the magnetic flux portion 50.

The infrared sensor may sense thermal radiation (e.g., IR radiation 58) emitted by the shaft 14 during rotation, and convert emitted IR radiation into an electrical temperature signal 59 (e.g., a voltage). The temperature sensor 12 transmits the temperature signal 59 to the controller 42 for processing. For example, the temperature signal 59 may be combined with the torque signal 54 in the receiver 52, thereby generating a combined signal 61. Similar to the torque signal 54 from the sensing coil 36, the temperature signal 59 may also be conditioned with electronic components, such as an amplifier, a filter, or the like, before or after combining with the torque signal 54 or processed by the processer 46 of the controller 42. Additionally, in certain embodiments, the signals 54, 59 may be combined in the processor 46, rather than in the receiver 52. The memory 48 may include instructions and algorithms executable by the processor 46 to combine the signals 54, 59 and compensate the measured torque based on the measured temperature (e.g., the signal 59). The temperature signal 59 may be communicated by wired or wireless connections to the controller 42, as discussed above with respect to the torque signal 54.

Figure 3:
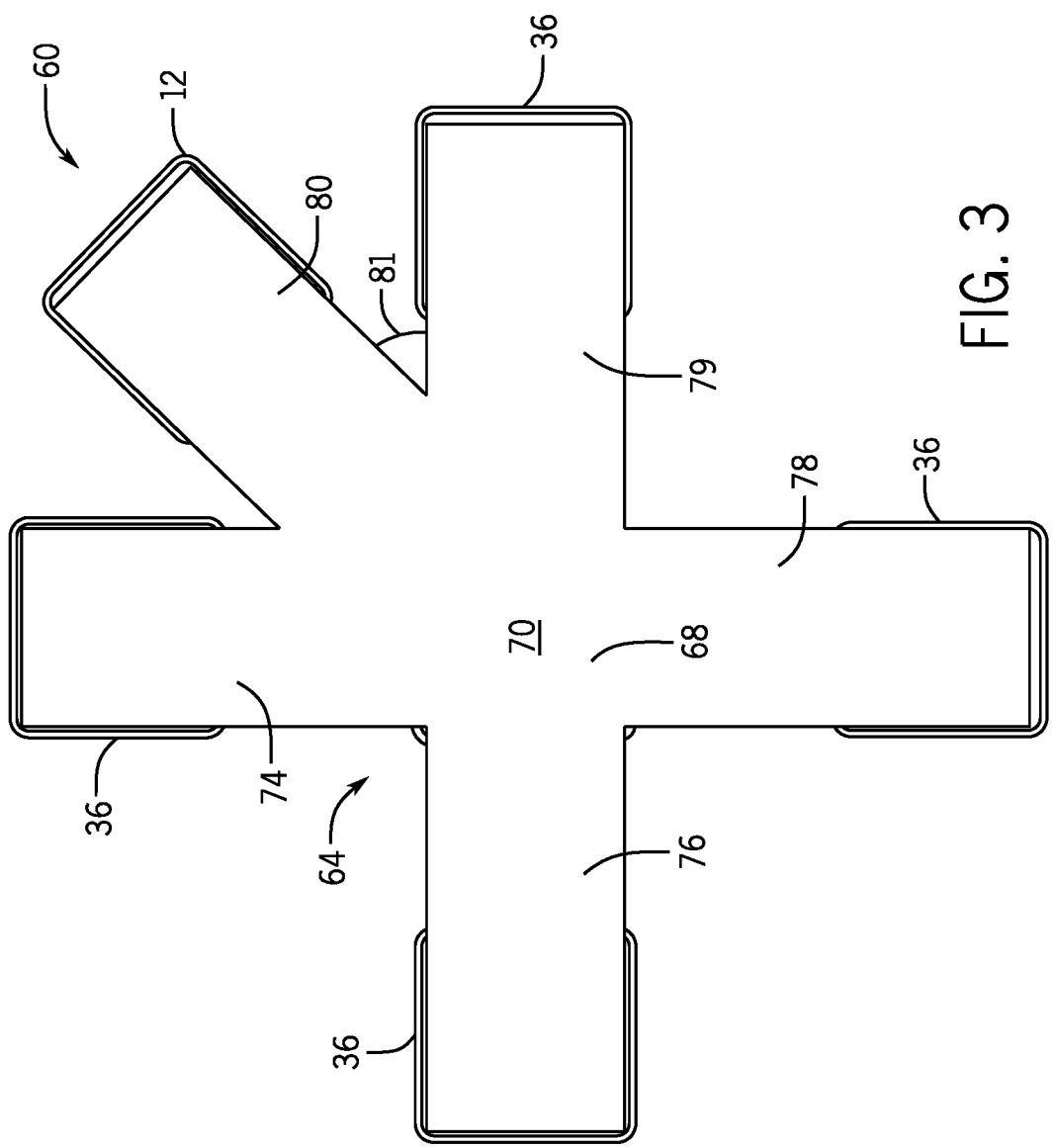
FIG. 3 is a top view of an embodiment of the magnetostrictive sensing system of FIG. 1, wherein the magnetostrictive sensing system includes a temperature pole in accordance with the present disclosure.

FIG. 3 is a top view of a sensor head 60 having the temperature sensor 12 disposed on a pole of the torque sensing system 10. Similar to the sensor head 20, the sensor head 60 includes a core 64 fabricated from any ferromagnetic material, e.g., iron, steel, nickel, cobalt, or other suitable magnetic material. The core 64 includes a cross axis yoke 68 with a cross yoke portion 70. Four members 74, 76, 78, and 79 of the cross axis yoke 68 extend radially outward in a plane from the yoke portion 70. The four members 74, 76, 78, and 79 are substantially orthogonal to each other around the yoke portion 70. Each of the four members 74, 76, 78, and 79 may extend from the yoke portion 70 in any configuration and for any length that enables each member to operate as described herein. In some embodiments, the yoke 68 may have any number of members, such as 1, 2, 3, 4, 5, 6, 7, 8, 9, 10, or more extending radially from the yoke portion 70. For example, in the illustrated embodiments, the yoke 68 includes an additional member 80. The members 74, 76, 78, 79, and 80 may be angularly spaced apart by approximately 10, 20, 30, 40, 45, 60, 75, 90, 120, or 135 degrees, or any combination thereof. In the illustrated embodiment, the members 74, 76, 78, and 79 are angularly spaced apart by approximately 90 degrees, and the member 80 is angularly spaced apart from the members 74, 79 by an acute angle 81.

Figure 4:
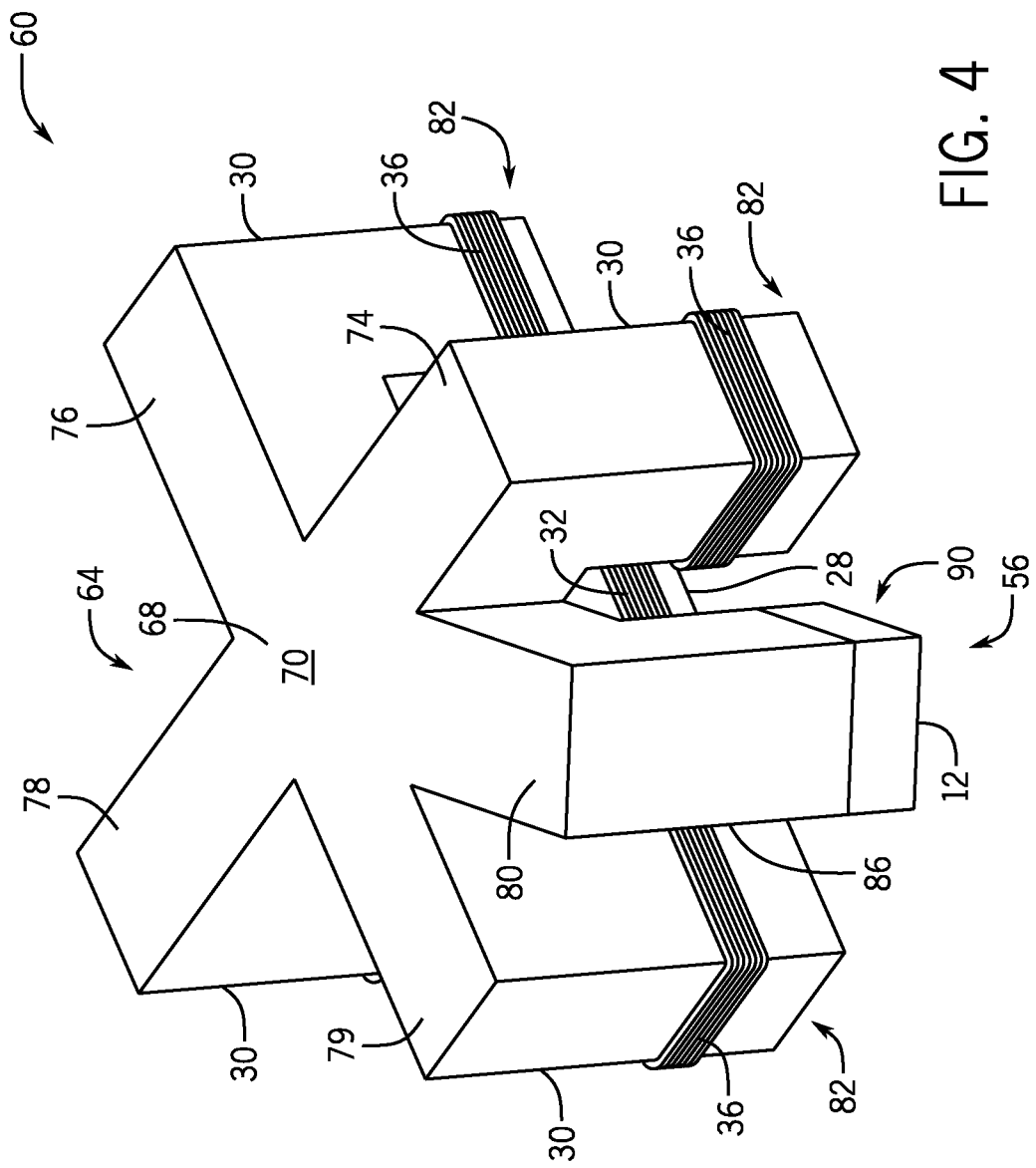
FIG. 4 is a perspective view of an embodiment of the magnetostrictive sensing system of FIG. 3, wherein the temperature pole includes the temperature sensor and a shield in accordance with the present disclosure.

FIG. 4 is a perspective view of the sensor head 60 illustrated in FIG. 3. As illustrated in FIG. 4, the driving pole 28 extends outward from the yoke portion 70, perpendicular to a planar surface defined by the yoke 68. In addition, the members 74, 76, 78, 79, and 80 extend outward from the yoke 68 substantially perpendicular to the planar surface defined by the yoke 68 and substantially parallel to driving pole 28. The sensing poles 30 extend from distal ends 82 of each respective member 74, 76, 78, and 79. Similarly, a temperature pole 86 extends from a distal end 90 of the member 80. In certain embodiments, the poles 28, 30, and 86 each extend an equal distance from the respective member 74, 76, 78, 79, and 80, such that the poles 28, 30, and 86 have the same length. To minimize variations in the gap 22 (e.g., between the shaft 14 and each respective pole 28, 30, and 86), the sensor head 60 may be rounded (e.g., dome-shaped). For example, the members 74, 76, 78, 79, and 80 may be oriented at an acute angle (e.g., less than 90 degrees) from the planar surface defined by the yoke 68, thereby forming a rounded sensor head 60. In this way, the equal length poles 28, 30, 86 may follow a contour of the shaft 14, and the gap 22 between the shaft 14 and each respective pole 28, 30, 86 is the same. In embodiments where the members 74, 76, 78, 79, and 80 are substantially perpendicular to the planar surface defined by the yoke 68, the poles 28, 30, and 86 may each have a variable length. The variable length for each pole 28, 30, 86 may facilitate maintaining a substantially constant gap 22 between the shaft 14 and each respective pole 28, 30, 86. Therefore, similar to embodiments having a rounded sensor head, a sensor head having variable length poles 28, 30, and 86 may follow the contour of the shaft 14.

The temperature pole 86 is disposed within the torque measurement neutral region 56 (e.g., between the members 74, 76, 78, and 79), such that the temperature pole 86 does not interfere with the magnetic flux portion 50. For example, the member 80 may be arranged substantially parallel with the axis of the shaft 14, such that the temperature pole 86 is disposed along the axis of the shaft 14. In certain embodiments, the temperature pole 86 is centered between two sensing poles 30. In this way, the temperature sensor 12 may be integrated into the torque sensing system 10, and measure the temperature of the shaft 14 during rotation of the shaft 14, rather than measuring the shaft temperature when the shaft 14 is static (e.g., not rotating).

In certain embodiments, the temperature pole 86 is configured to be substantially or completely insensitive to the magnetic flux portion 50. That is, the temperature pole 86 does not sense (e.g., measure) the torque of the shaft 14 and/or is impermeable to the magnetic flux portion 50. In some embodiments, the core 64 may have any number of poles (including driving poles, sensing poles, and temperature poles) extending from the yoke 68 that enables the core 64 to operate as described herein. For example, the core may have one driving pole and 1, 2, 3, 4, 5, 6, 7, 8, 9, 10 or more sensing poles and temperature poles extending from the yoke 68.

As discussed above, the driving pole 28 includes the driving coil 32 for driving the magnetic flux portion 50 into the shaft 14. Similarly, the sensing poles 30 include sensing coils 36 wrapped around each respective member 74, 76, 78, and 79. The sensing coils 36 detect the magnetic flux portion 50 after the magnetic flux portion 50 passes through the shaft 14. The temperature sensor 12 is disposed on the temperature pole 86 and senses the heat (e.g., IR heat 58) from the rotating shaft 14. For example, the temperature sensor 12 may be at a distal end 90 of the temperature pole 86, in the yoke 68 of the member 80, or any other suitable location along the temperature pole 86.

Figure 5:
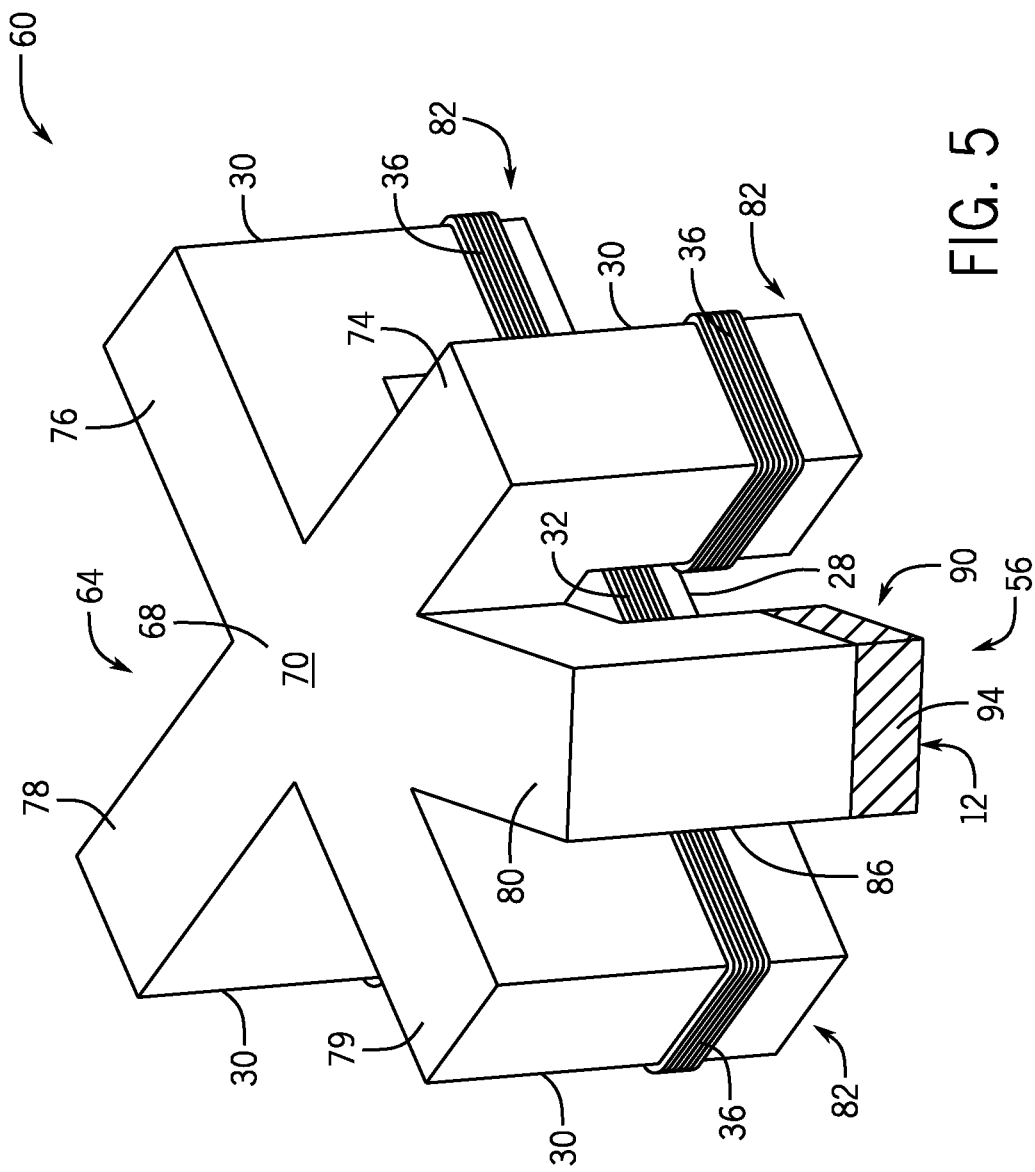
FIG. 5 is a perspective view of an embodiment of the magnetostrictive sensing system of FIG. 4, wherein the temperature pole includes the temperature sensor in accordance with the present disclosure.

In certain embodiments, at least a portion of the temperature pole 86 may be made from a non-ferromagnetic material, such that the temperature pole 86 has a low permeability for the magnetic flux portion 50. For example, the temperature pole 86 may be made of ceramic, composite, plastic, or any other suitable non-ferromagnetic material. In other embodiments, the distal end 90 of the temperature pole 86 may have a shield 94, as illustrated in FIG. 5. The shield 94 may be coupled to the distal end 90 of the temperature pole 86 via one or more fasteners, an adhesive or bonding material, a snap-fit joint, a dovetail joint, a hook in slot joint, or any combination thereof. In certain embodiments, the shield 94 is coated onto the distal end 90 of the temperature pole 86. In other embodiments, the integrated circuit coupled to the temperature sensor 12 may be part of the shield 94. The shield 94 may be an electromagnetic shield including materials such as, but not limited to, copper, aluminum, phosphor bronze, glass, silicone, composites, polymers, or any other suitable material that may block the transmission of the magnetic flux portion 50 through the temperature pole 86.

In operation, the sensor head 60 drives an AC current through the driving coil 32 to induce the magnetic flux portion 50, as discussed above with reference to FIG. 1. The magnetic flux portion 50 flows from the driving pole 28, through the shaft 14, to the four sensing poles 30, where the respective sensing coils 36 detect the magnetic flux portion 50. The temperature sensor 12 may monitor the temperature of the shaft 14 during rotation by detecting the radiative heat (e.g., the IR heat 58) emitted from the shaft 14. Because the temperature pole 86 is in the torque measurement neutral region 56 and/or has a low magnetic permeability, the magnetic flux portion 50 flowing through the poles 28, 30 may not be disturbed by the temperature pole 86. In addition, because the temperature sensor 12 is positioned near the shaft 14, at a location where the torque is also being measured, an accurate shaft temperature may be obtained. For example, the measured temperature of the shaft 14 may be more accurate compared to measuring the shaft temperature in an area away from the torque measurement location due, in part, to a temperature gradient resulting from dissipation of the IR heat 58. Therefore, because the temperature of the shaft 14 may be measured in real-time (e.g., during rotation of the shaft 14) and at the location of the torque measurement, accurate temperature measurements may be generated and the accuracy of the compensated torque measurement may be increased.

Both the sensing coils 36 and the temperature sensor 12 transmit electrical signals to the controller 42 indicative of the torque and shaft temperature, respectively. The processor 46 may condition and combine the torque and temperature signals to compensate the torque measurement based at least in part on effects of temperature variations on the magnetic permeability of the shaft 14. As such, the torque measurements generated by the torque sensing system 10 may be more accurate compared to torque sensing systems that do not have an integrated temperature sensor 12. Integrating the temperature sensor 12 with the torque sensing system 10 may enable temperature monitoring during shaft rotation, and may facilitate signal integration (e.g., combining the temperature and torque signals). For example, without the disclosed embodiments, integrating signals from two separate sensors (e.g., through interconnecting cables) may increase signal to noise ratios of the systems due, in part, to noise picked up by the interconnecting cabling during transmission of the signal. Moreover, integrating torque and temperature signals generated in a single sensing system (e.g., the torque sensing system 10) may also facilitate signal processing and increase accuracy of sensor measurements. Additionally, having a torque sensing system 10 that measures both torque and temperature may reduce the amount of sensing equipment (e.g., stand alone temperature sensors and torque sensing system) for monitoring operation of the equipment 16, and the overall costs associated with manufacturing two separate sensors (e.g., a temperature sensor and a torque sensor) compared to one sensor may be decreased.

Figure 6:
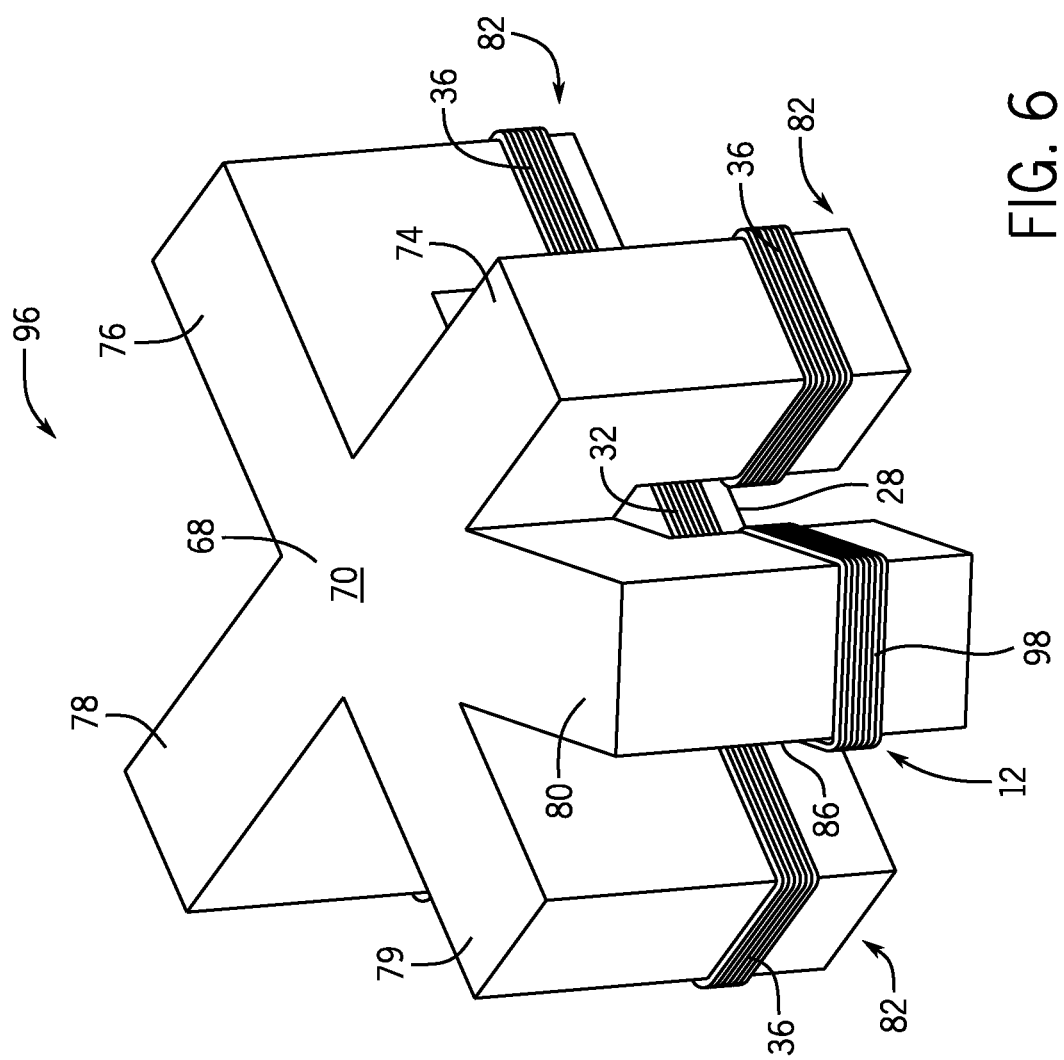
FIG. 6 is a perspective view of an embodiment of the magnetostrictive sensing system of FIG. 3, wherein the temperature sensor is a coil wrapped around the temperature pole in accordance with the present disclosure.

In certain embodiments, the temperature sensor 12 includes a temperature coil (e.g., an inductor coil or any other suitable coil), rather than a non-contact IR temperature sensor. FIG. 6 is a perspective view of a sensor head 96 having a temperature coil 98. Similar to the sensor head 60, the sensor head 96 includes the members 74, 76, 78, 79, and 80 extending planarly outward from the yoke portion 70, and the poles 30, 86 at terminating ends of each respective member 74, 76, 78, 79, and 80. In the illustrated embodiment, the temperature coil 98 is wrapped around the temperature pole 80. In other embodiments, the temperature coil 98 may be wrapped around the driving pole 28. For example, the temperature coil 98 may be disposed above or below the driving coil 32.

The temperature coil 98 may transmit an electrical signal to the controller 42 indicative of the temperature of the shaft 14. An electrical conductivity of the temperature coil 98 may be affected by the temperature of the shaft 14. For example, the temperature of the radiative heat (e.g., the IR heat 58) emitted from the shaft 14 may increase or decrease the conductivity of the temperature coil 98. This change in conductivity may be used to determine the temperature of the shaft 14. The processor 46 may use algorithms and/or look-up tables stored in the memory 48 to determine a temperature of the shaft 14 based on the change in conductivity of the temperature coil 98.

In certain embodiments, the magnetic flux portion 50 flows through the temperature pole 86. In this particular embodiment, the temperature pole 86 is permeable to the magnetic flux portion 50. That is, the temperature pole 86 is within a torque measurement neutral region, such as the torque measurement neutral region 56. The shaft torque may cause an anisotropic response in the system 10. In general, temperature effects are isotropic and are sensed equally by the coils 32, 36, and 98. Therefore, in one embodiment, the system 10 may be oriented in such a way that the magnetic flux portion 50 flowing through the temperature pole 86 is insensitive (e.g., unaffected) to the anisotropic changes resulting from the torque. In other embodiments, the poles 28, 30, 86 and the coils 32, 36, 98 may each have a different vector orientation. The anisotropic and isotropic components resulting from the shaft torque may be resolved by the processor 46 (e.g., with analog circuitry or digital signal processing). In certain embodiments, the sensor head 96 does not include the temperature pole 86. As such, the shaft temperature is determined based on the temperature effects sensed by the coils 32, 36 on the poles 28, 30, respectively.

In addition to determining the shaft temperature with the temperature sensor 12, the temperature of the shaft 14 can be detected inductively without a need to have separate temperature sensing devices. This method relies on the changes in the bulk resistivity and/or permeability of steel under varying temperature. The changes in the electromagnetic properties of the sensor head 98 affects the penetration depth of the magnetic flux portion 50 that enters the shaft 14. These changes are observed by the sensing coils 36 and by the drive coil 32. This is due, in part, to the magnetic flux portion 50 going through the shaft 14, the drive coil 32, and at least one of the plurality of the sense coils 36. The signal changes in the coils 32, 36 are analyzed in parallel with the signal changes due to torque. The temperature can be resolved, because of a relationship between the temperature of the shaft and the bulk effect common in all the coils 32, 36, resulting from the anisotropy in the measured signals (e.g., by the coils 32, 36) caused by the shaft torque.

In accordance with the present disclosure, one or more non-contact temperature sensors 12 may be integrated into the torque sensing device 10, such that temperature of the shaft 14 may be measured during rotation. The temperature sensor 12 is positioned in a magnetic neutral region (e.g., the torque measurement neutral region 56) of the torque sensing system 10, such that the temperature sensor 12 does not interfere with torque sensing regions of the torque sensing system 10. In this way, the temperature sensor 12 may be positioned at a torque measurement location without disturbing the magnetic flux portion 50. Therefore, accurate temperature measurements may be obtained, enabling accurate compensation of the torque measurements. In addition, integrating the temperature sensor 12 into the sensor head (e.g., the sensor heads 20, 60, and 96) may facilitate integration of torque and temperature signals generated by the sensing coils 36 and temperature sensor 12, respectively, and reduce signal to noise ratios that may otherwise be introduced during integration of signals from separate torque and temperature sensors.

Technical effects of the subject matter disclosed herein include, but are not limited to, integrating a non-contact temperature sensor with a torque sensor, such that a temperature of a rotating shaft may be accurately measured. Advantageously, the resulting torque sensing system may compensate torque measurements based at least in part on shaft temperature variations, thereby increasing the accuracy of the torque measurements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
    a magnetostrictive sensor having a sensor head comprising:
        a driving pole, wherein the driving pole comprises a driving coil configured to receive a driving current and to emit a magnetic flux portion through a rotary structure;
        a sensing pole comprising a sensing coil configured to receive the magnetic flux portion and to transmit a signal based at least in part on the received magnetic flux portion, wherein the received magnetic flux portion is based at least in part on a force on the rotary structure; and
        a temperature sensor disposed on the sensor head, wherein the temperature sensor is configured to measure a temperature of the rotary structure.

2. The system of claim 1, wherein the temperature sensor is coupled to a temperature sensing pole of the magnetostrictive sensor.

3. The system of claim 2, wherein the temperature sensing pole is disposed between two sensing poles.

4. The system of claim 1, wherein the temperature sensor is coupled to the driving pole.

5. The system of claim 1, wherein the temperature sensor is offset from the rotary structure.

6. The system of claim 1, wherein the temperature sensor comprises an infrared sensor.

7. The system of claim 1, wherein the temperature sensor comprises an inductive coil.

8. The system of claim 1, wherein the magnetostrictive sensor is a torque sensor.

9. The system of claim 1, comprising a controller configured to receive the signal from the sensing coil and a temperature signal from the temperature sensor, wherein the signal is based on a torque on the rotary structure, and the controller comprises:
    one or more tangible, non-transitory, machine-readable media collectively storing one or more sets of instructions; and
    one or more processing devices configured to execute the one or more sets of instructions to monitor or control operations of the system, wherein the one or more sets of instructions is configured to combine the signal and the temperature signal to generate a compensated torque signal, wherein the one or more processing devices is configured to determine the torque on the rotary structure based on the compensated torque signal.

10. A system, comprising:
    a magnetostrictive sensor head comprising:
        a driving coil coupled to a driving pole extending from a sensor head core, configured to receive a driving current, and configured to emit a magnetic flux portion through a rotary structure;
        a sensing coil coupled to a sensing pole extending from the sensor head core, wherein the sensing coil is configured to receive the magnetic flux portion, the sensing coil transmits a first signal based at least in part on the received magnetic flux portion, wherein the received magnetic flux portion is based at least in part on a force on the rotary structure at a section of the rotary structure opposite the magnetostrictive sensor head; and
        a temperature sensor coupled to the magnetostrictive sensor head, wherein the temperature sensor transmits a second signal based on heat emitted from the section of the rotary structure.

11. The system of claim 10, wherein the temperature sensor is disposed within a magnetic neutral region of the magnetostrictive sensor head.

12. The system of claim 10, wherein the temperature sensor is not in contact with the rotary structure.

13. The system of claim 10, wherein the temperature sensor comprises an infrared sensor directed to the section of the rotary structure.

14. The system of claim 10, wherein the temperature sensor comprises an inductive coil.

15. The system of claim 10, wherein the temperature sensor is coupled to a temperature pole disposed between two sensing poles, and wherein the temperature pole is within a magnetic neutral region of the magnetostrictive sensor head.

16. The system of claim 10, wherein the temperature sensor is disposed on the driving pole.

17. The system of claim 10, wherein the temperature sensor is configured to measure the temperature of the section of the rotary structure when the rotary structure is rotating.

18. A method, comprising:
    generating a magnetic flux portion with a driving coil coupled to a driving pole of a magnetostrictive torque sensor;
    directing the magnetic flux portion through a rotary structure and a sensing pole of the magnetostrictive torque sensor, wherein the rotary structure comprises a ferromagnetic material;
    detecting the magnetic flux portion with a sensing coil coupled to the sensing pole, wherein the sensing coil is configured to generate a torque signal based at least in part on a torque on the rotary structure;
    measuring a temperature of the rotary structure with a temperature sensor disposed within the magnetostrictive torque sensor, wherein the temperature sensor is configured to generate a temperature signal; and
    determining the torque on the rotary structure based at least in part on the torque signal from the sensing coil and the temperature signal from the temperature sensor.

19. The method of claim 18, wherein the torque signal is based at least in part on the torque on a section of the rotary structure opposite the magnetostrictive torque sensor, and the temperature signal is based at least in part on the temperature of the section of the rotary structure.

20. The method of claim 18, wherein the temperature sensor is not in contact with the rotary structure.

* * * * *